United States Patent [19]

Fouilleux et al.

[11] Patent Number: 5,036,957
[45] Date of Patent: Aug. 6, 1991

[54] DISC BRAKE AND SEALING BOOT THEREFOR

[75] Inventors: Bernard Fouilleux, Champigny sur Marne; Francis Valmir, Argenteuil; Eric Schonenberger, Bois Colombes, all of France

[73] Assignee: General Motors France, France

[21] Appl. No.: 431,550

[22] Filed: Nov. 6, 1989

[30] Foreign Application Priority Data

Jan. 28, 1989 [GB] United Kingdom ............... 8901917

[51] Int. Cl.$^5$ ............................................. F16D 65/18
[52] U.S. Cl. ................................ 188/73.44; 188/73.1
[58] Field of Search .................. 188/73.1, 73.34, 73.44, 188/73.45

[56] References Cited

U.S. PATENT DOCUMENTS

| | | |
|---|---|---|
| 3,942,611 | 3/1976 | Burnett .................. 188/73.44 X |
| 4,082,167 | 4/1978 | Einchcombe et al. ........... 188/73.34 |
| 4,392,560 | 7/1983 | Nakasu et al. ................. 188/73.34 |
| 4,446,948 | 5/1984 | Melinat ........................... 188/73.45 |
| 4,467,898 | 8/1984 | Courbot et al. ............ 188/73.34 X |
| 4,570,760 | 2/1986 | Schmidt ........................... 188/73.44 |
| 4,678,064 | 7/1987 | Adachi et al. .................... 188/73.45 |
| 4,709,789 | 12/1987 | Czich et al. ...................... 188/73.44 |
| 4,762,206 | 8/1988 | Arimitsu .......................... 188/73.45 |
| 4,807,725 | 2/1989 | Weiler et al. ................ 188/73.44 X |

FOREIGN PATENT DOCUMENTS 2041121 9/1980 United Kingdom ............ 188/73.44

Primary Examiner—Robert J. Oberleitner
Assistant Examiner—Alfred Muratori
Attorney, Agent, or Firm—Ernest E. Helms

[57] ABSTRACT

A disc brake (70) for a motor vehicle comprising a stationary support (74) for mounting on the motor vehicle; a caliper (72) slidably mounted on the stationary support; at least one pin (14) fixed to either the stationary support or the caliper and slidably positioned in an axial bore (16) in the other to extend therethrough for slidably mounting the caliper; and a sealing boot (36) having a first end (38) positioned in the axial bore in sealing engagement with the axial bore, the other end (40) sealingly engaging the pin outside the axial bore, with an elastomeric bellows portion (42') extending between the two ends; wherein the first end comprises a plastics insert (44) having a substantially cylindrical portion (46) in sliding engagement with the pin and a resilient lip (48) having a free end (52) directed away from the cylindrical portion to provide the sealing engagement with the axial bore. Reduces risk of sticking at the sliding interface between the pin and the sealing boot.

7 Claims, 3 Drawing Sheets

DISC BRAKE AND SEALING BOOT THEREFOR

This invention relates to a disc brake for a motor vehicle, and to a sealing boot for the disc brake.

Disc brakes are known which comprise a stationary support for mounting on a motor vehicle, a caliper slidably mounted on the stationary support, and at least one pin fixed to either the stationary support or the caliper and slidably inserted into an axial bore in the other for slidably mounting the caliper. In such arrangements it is known to provide an elastomeric sealing boot at one or both ends of the pin. A first end of the or each sealing boot is positioned in the axial bore between the surface of the axial bore and the pin. The other (second) end of the sealing boot sealingly engages the pin outside the axial bore. A bellows portion connects the two ends of the sealing boot. Such a known arrangement is shown in GB Patent No. 1494796.

The first end of the sealing boot is usually in the form of a block of elastomeric material, and is usually positioned in a groove in the axial bore but still in engagement with the pin. This arrangement allows relative sliding of the pin with respect to the axial bore in an axial direction, whilst still providing a seal with the axial bore. The block of material also allows limited relative radial movement which compensates for any small variations in manufacturing tolerances. The sealing boot is such that it damps any relative movement between the pin and the axial bore.

Several attempts have been made to improve the sealing and sliding efficiency of the first end of the sealing boot. One such example is shown in GB Patent Application No. 2160936A. However, problems have still been encountered with regard to the sliding between the first end of the sealing boot and the pin. This is mainly due to sticking at the interface between the pin (which is usually of steel) and the elastomeric material of the first end of the sealing boot. Such sticking obviously affects the sliding efficiency at this interface.

It is an object of the present invention to overcome the above mentioned problem.

To this end, a disc brake for a motor vehicle in accordance with the present invention comprises a stationary support for mounting on the motor vehicle; a caliper slidably mounted on the stationary support; at least one pin fixed to either the stationary support or the caliper and slidably positioned in an axial bore in the other to extend therethrough for slidably mounting the caliper; and a sealing boot having a first end positioned in the axial bore in sealing engagement with the axial bore, the other end sealingly engaging the pin outside the axial bore, with an elastomeric bellows portion extending between the two ends; wherein the first end comprises a plastics insert having a substantially cylindrical portion in sliding engagement with the pin and a resilient lip having a free end directed away from the cylindrical portion to provide the sealing engagement with the axial bore.

Preferably, the elastomeric material of the bellows portion extends around the resilient lip to key the plastics insert to the bellows portion and to provide the sealing engagement with the axial bore.

The resilient lip preferably comprises a number of resilient fingers which are spaced apart around the outer circumferential surface of the cylindrical portion. In this case, where the elastomeric material of the bellows portion extends around the resilient fingers, the elastomeric material preferably also fills the gaps between the resilient fingers.

Preferably, the axial bore has a second groove in its surface at its open end in which the first end of the sealing boot is positioned. In this case, the first end of the sealing boot sealingly engages the surface of the axial bore in the second groove. The resilient lip preferably makes a snap fit in a third retention groove in the second groove.

The other end of the sealing boot is preferably positioned in a groove in the pin to sealingly engage the pin.

Preferably, the cylindrical portion of the plastics insert has a rearwardly directed (as hereinbelow defined) resilient portion which slidingly engages the pin. The resilient portion is preferably separated from the remainder of the cylindrical portion by a number of circumferentially extending apertures. Where the axial bore has a second groove, the resilient portion is preferably positioned in a first groove in the axial bore which is adjacent the second groove, with the second groove having a smaller diameter than the second groove.

The pin preferably comprises a bolt and a hollow sleeve through which the bolt passes for screw threaded engagement with the caliper or the stationary support.

The present invention also includes a sealing boot for use in a disc brake as hereinbefore defined.

The present invention will now be described, by way of example, with reference to the accompanying drawings, in which.

Figure 1:
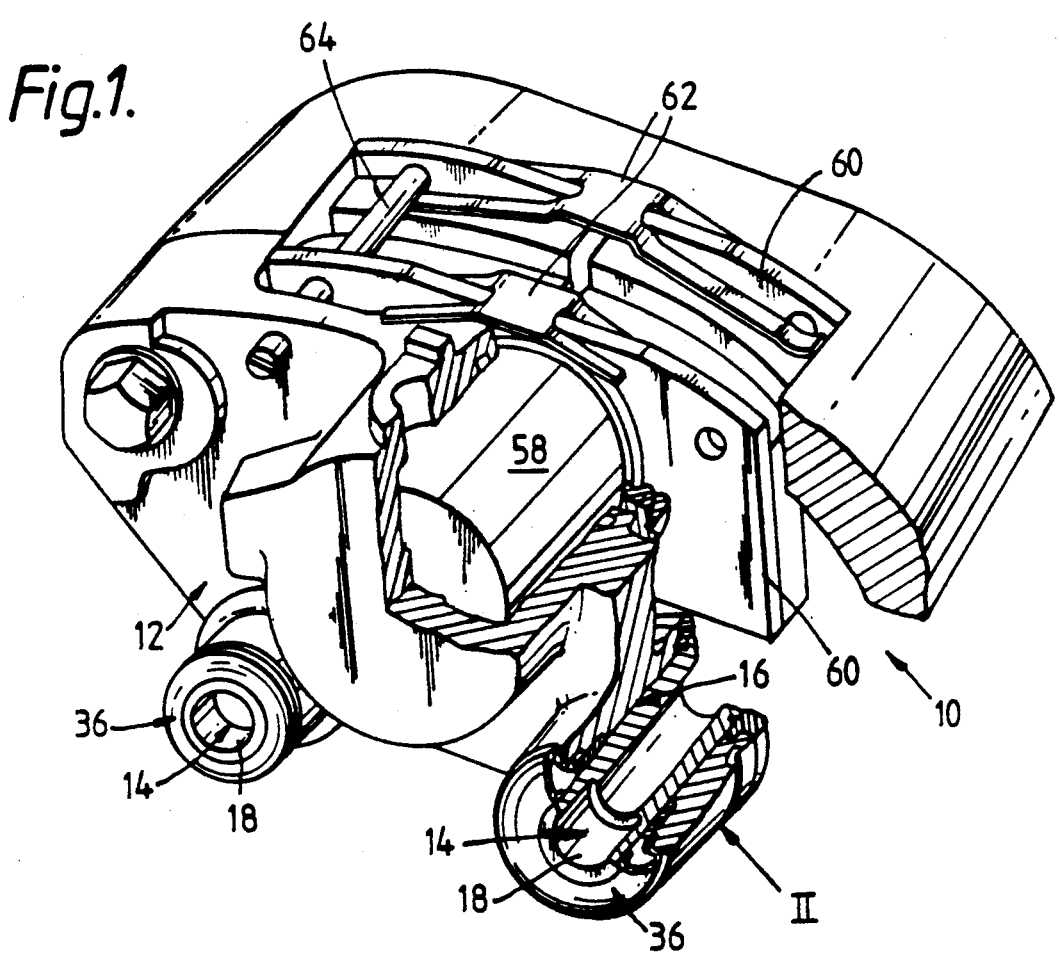
FIG. 1 is a perspective view, partially cut away, of a first embodiment of disc brake in accordance with the present invention.
Figure 2:
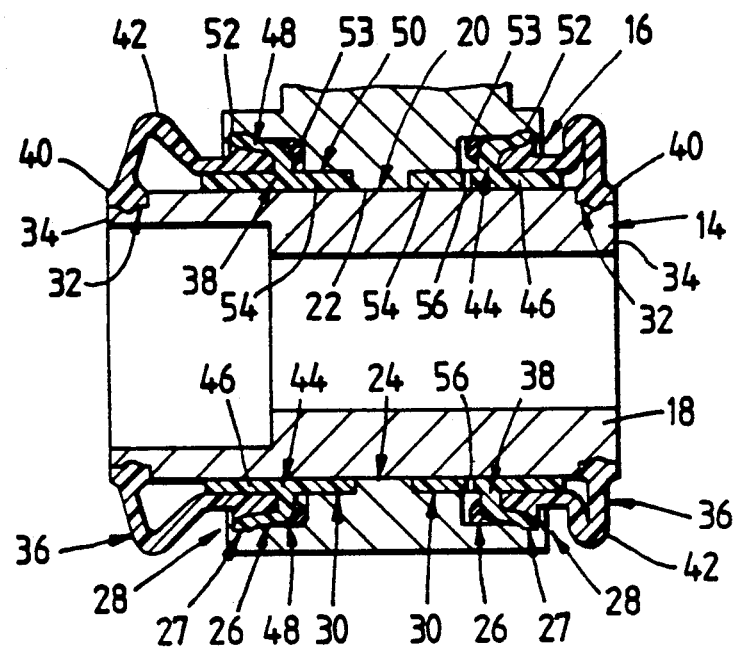
FIG. 2 is a cross-sectional view of the pin and sealing boot in area II of FIG. 1.

Referring to FIGS. 1 and 2 of the accompanying drawings, the disc brake 10 comprises a caliper 12 which is slidably mountable on a stationary support (not shown). The slidable mounting is provided by two pins 14 which are spaced apart, and each of which is slidably positioned in an axial bore 16 in the caliper 12. Each pin 14 is defined by a hollow sleeve 18 of steel and a bolt (not shown) which passes through the hollow sleeve and is screw threaded to the stationary support. Each hollow sleeve 18 extends through its respective axial bore 16 and has an outer surface 20 in sliding engagement with a central portion 22 of the surface 24 of the axial bore.

The surface 24 of each axial bore 16 also includes a second groove 26 at each open end 28 of the axial bore, and a second groove 30 adjacent each first groove. The first and second grooves 30,26 are coaxial with the axial bore 16, with the second groove 26 having a larger diameter than the first groove 30. The second groove 26 extends to the open end 28 of the axial bore 16, and the first groove 30 extends into the second groove. The hollow sleeve 18 also has a groove 32 in its outer surface 20 at or adjacent each end 34 of the hollow sleeve.

The disc brake 10 also includes a sealing boot 36 at each open end 28 of each axial bore 16 which substantially prevents dirt and/or moisture penetrating the area between the outer surface 20 of the hollow sleeve 18 and the surface 24 of the axial bore 16. Each sealing boot 36 comprises a first end 38 which is positioned in the second and first grooves 26,30 at the respective open end 28 of the axial bore 16, with the other end 40 of the sealing boot being positioned in the respective groove 32 in the hollow sleeve 18 to make a sealed engagement therewith. The sealing boot 36 also includes a bellows portion 42 extending between the first end 38 and the other end 40. The bellows portion 42 is flexible and allows for relative axial movement between the first end 38 and the other end 40 of the sealing boot 36 as the pin 14 slides relative to the axial bore 16 in the axial direction. This arrangement damps relative movement in the axial direction between the pin 14 and the axial bore 16. A retracted form of the bellows portion 42 is shown for the right sealing boot 36 as viewed in FIG. 2, and an expanded form is shown for the left sealing boot.

The first end 38 of the sealing boot 36 comprises a plastics insert 44 having a substantially cylindrical portion 46 and a resilient lip 48. The resilient lip 48 is positioned around the outer circumferential surface 50 of the cylindrical portion 46 and has a free end 52 directed away outwardly from the outer circumferential surface 50 at an acute angle and in a substantially forward direction. For the sake of clarity, the forward direction is taken to be in an axial direction towards the respective open end 28 of the axial bore 16. Apart from the plastics insert 44, the remainder of the sealing boot 36 is moulded or otherwise formed from elastomeric material, with a portion 53 of the elastomeric material extending around the resilient lip 48 with a portion of the elastomeric material captured between the resilient lip 48 and the cylindrical portion 46. This arrangement keys the plastics insert 44 to the remainder of the sealing boot 36. In use, the resilient lip 48 makes a third latching engagement in a retention groove 27 formed in its respective second groove 26 and, due to its resilience, pushes the portion 53 of the elastomeric material with which it is keyed into sealing engagement with the surface 24 of the axial bore 16 in the second groove 26. This arrangement also damps relative radial movement between the pin 14 and the axial bore 16, and allows for manufacturing tolerances. In a preferred arrangement, the resilient lip 48 is defined by a number of resilient fingers which are spaced apart around the outer circumferential surface 50 of the cylindrical portion 46, with the portion 53 of the elastomeric material also filling the gaps between the resilient fingers.

The cylindrical portion 46 of the plastics insert 44 has a rearwardly directed resilient portion 54 which is separated from the remainder of the cylindrical portion by circumferentially extending apertures 56. For the sake of clarity, the rearward direction is taken to be in an axial direction away from the respective open end 28 of the axial bore 16. The resilient portion 54, in use, is nested and positioned in its respective first groove 30 to provide sliding engagement with the outer surface 20 of the hollow sleeve 18. This arrangement is such that there is no sliding engagement between the pin 14 and the elastomeric material of the sealing boot 36, and hence problems associated with sticking between the, say, steel of the hollow sleeve 18 and the elastomeric material of the sealing boot 36 are no longer encountered.

Apart from overcoming the problems of sticking, the present invention has been found to have the further advantages of being easier to manufacture and assemble the various parts.

The disc brake 10 shown in FIG. 1 also includes a hydraulically actuable piston 58, and a pair of brake shoes 60 with associated anti-rattle springs 62 slidably mounted on slide pins 64, only one of which is shown.

Figure 4:
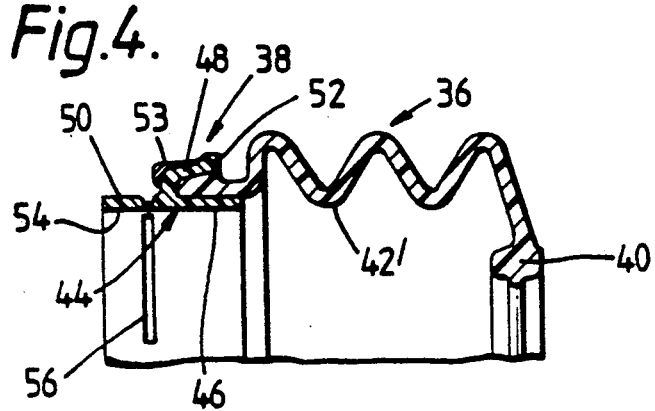
FIG. 4 is a partial cross-sectional view of the sealing boot in area IV of FIG. 3.
Figure 3:
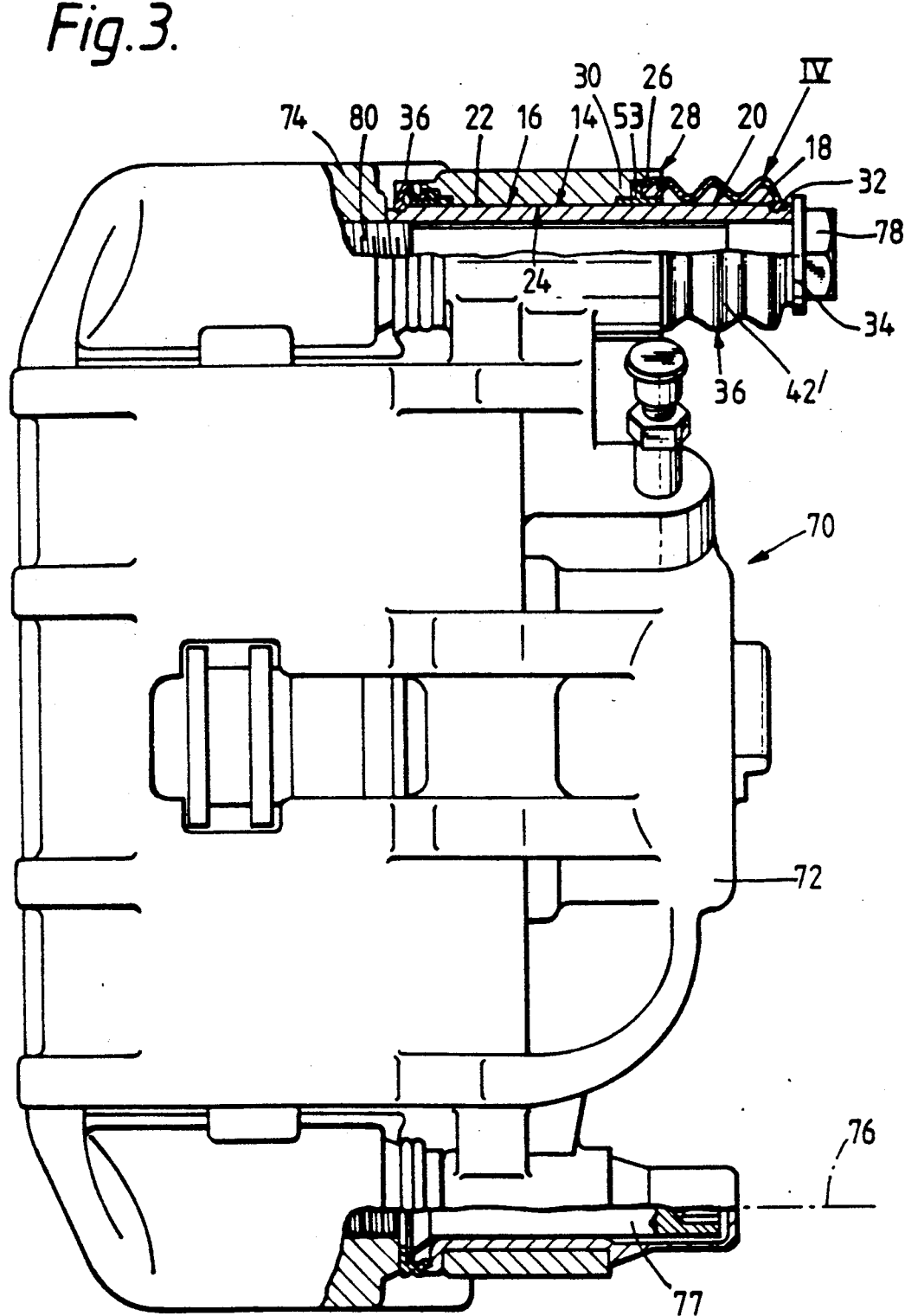
FIG. 3 is a top view, partially cut away, of a second embodiment of brake caliper in accordance with the present invention.

A second embodiment of disc brake 70 is shown in FIGS. 3 and 4. Like parts have been given the same reference number as in FIGS. 1 and 2. In this arrangement, the caliper 72 is slidingly mounted on a stationary support 74 which is fixed to the motor vehicle (not shown). The caliper 72 can also rotate relative to the stationary support 74 about an axis 76 of a pin 77 to allow replacement of the brake shoes. In this arrangement, pins 14 and 77 provide the sliding mount for the caliper 72, but only pin 14 has a sealing boot 36 at each end thereof. The sealing boot 36 is shown in more detail in FIG. 4 and is identical to that shown in FIGS. 1 and 2 except that the bellows portion 42' is longer for this particular application. As in FIGS. 1 and 2, the pin 14 comprises a hollow sleeve 18 and a bolt 78 which is screw threaded 80 to the stationary support 74.

In the arrangements of disc brake 10, 70 disclosed above the clearance between the central portion 22 of the surface 24 of the axial bore 16 and the outer surface 20 of the hollow sleeve 18 is negligibly small, and even though the resilient portion 54 of the plastics insert 44 remains in contact with the hollow sleeve 18, the first end 38 of the sealing boot 36 is compressible such that any torque generated on braking is still transmitted from the caliper 12, 72 to its stationary support 74 by way of the metal to metal contact between the hollow sleeve 18 and the central portion 22 of the surface 24 of the axial bore 16.

We claim:

1. A disc brake for a motor vehicle comprising:
 a stationary support for mounting on the motor vehicle;
 a caliper slidably mounted on the stationary support;
 at least one pin fixed to either the stationary support or the caliper and slidably positioned within an axial bore in the other end to extend therethrough for slidably mounting the caliper with the axial bore having adjacent progressively greater diameter first, second and third diametrical grooves;
 and a sealing boot having a first end positioned in the axial bore in sealing engagement with the axial bore, a second end sealably engaging the pin outside the axial bore, with an elastomeric bellows portion extending between the two ends; wherein the first end comprises a plastics insert having a substantially cylindrical portion in sliding engagement with the pin with an end nesting within the first groove of the axial bore, and the plastics insert having a radially outward projecting resilient lip having a free end directed away from the cylindrical portion capturing an end of the elastomeric bellows portion in the second groove, and, the resilient lip comprising a number of resilient fingers which are spaced apart by gaps around an outer cylindrical surface of the cylindrical portion of the plastics insert, the elastomeric material of the bellows portion extending around the resilient lip to key the plastics extending around the resilient lip to key the plastics insert to the bellows portion and to provide sealing engagement within the axial bore and extending around the resilient fingers in filling up the gaps between the resilient fingers and the resilient lip making a snap fit into the third groove.

2. A disc brake as claimed in claim 1, wherein the second end of the sealing boot makes a sealing engagement in a groove in the pin.

3. A disc brake as claimed in claim 1, wherein the cylindrical portion of the plastics insert has a rearwardly directed resilient portion which slidably engages the pin.

4. A disc brake as claimed in claim 3, wherein the rearwardly directed resilient portion is separated from the remainder of the cylindrical portion by a number of circumferentially extending apertures.

5. A disc brake as claimed in claim 3 wherein the rearwardly directed resilient portion is positioned in the first groove in the axial bore which is adjacent the second groove.

6. A disc brake as claimed in claim 1, wherein the pin comprises a bolt and a hollow sleeve through which the bolt extends for screw threaded engagement with the caliper or the stationary support.

7. A sealing boot for a motor vehicle disc brake including a stationary support for mounting on the motor vehicle, a caliper slidably mounted on the stationary support, at least one pin fixed to either the stationary support or the caliper and slidably positioned within an axial bore in the other to extend therethrough for slidably mounting the caliper with the axial bore having adjacent progressively greater diameter first, second and third diametrical grooves the sealing boot comprising:

a first end positioned in the axial bore in sealing engagement with the axial bore, a second end sealably engaging the pin outside the axial bore, with an elastomeric bellows portion extending between the two ends; wherein the first end comprises a plastics insert having a substantially cylindrical portion in sliding engagement with the pin with an end nesting within the first groove of the axial bore, and the plastics insert having a radially outward projecting resilient lip having a free end directed away from the cylindrical portion capturing an end of the elastomeric bellows portion in the second groove, the resilient lip comprising a number of resilient fingers which are spaced apart by gaps around an outer cylindrical surface of the cylindrical portion of the plastics insert, the elastomeric material of the bellows portion extending around the resilient lip to key the plastics insert to the bellows portion and to provide sealing engagement within the axial bore within the second groove of the axial bore and extending around the resilient fingers in filling up the gaps between the resilient fingers and the resilient lip making a snap fit into the third groove.

* * * * *